H. M. HOBART.
ELECTRIC SHIP PROPULSION.
APPLICATION FILED MAY 19, 1916.
1,331,940.
Patented Feb. 24, 1920.
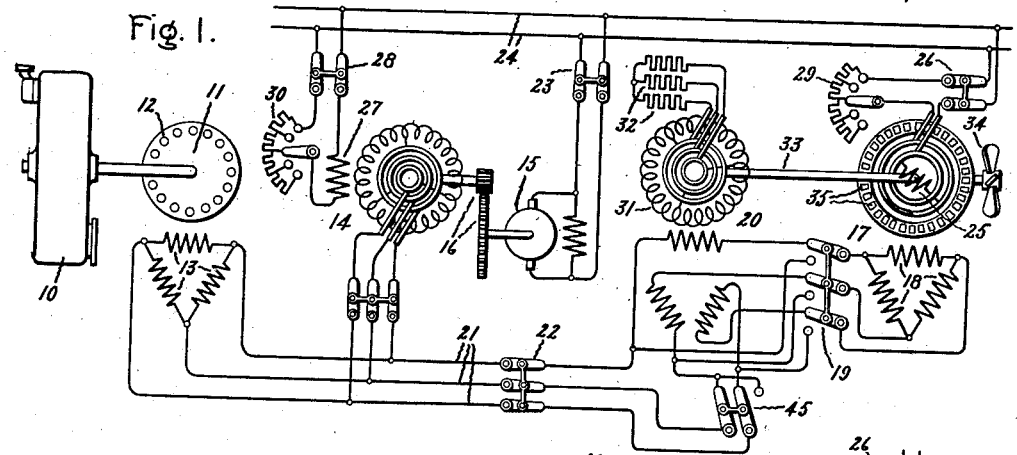
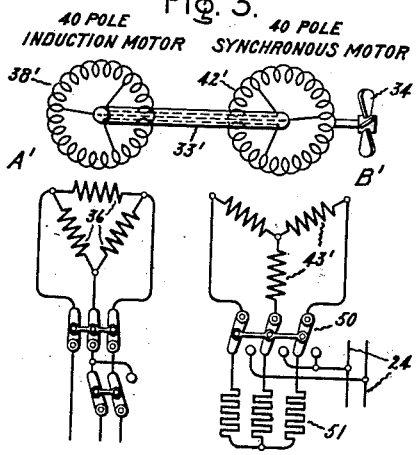
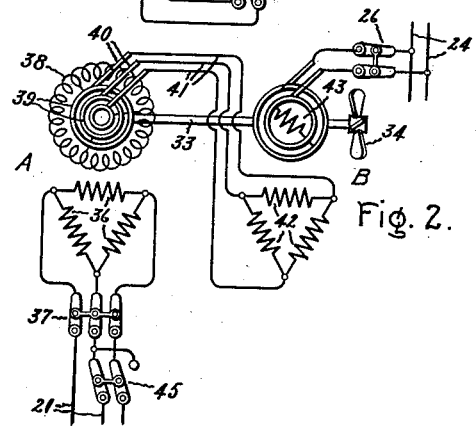
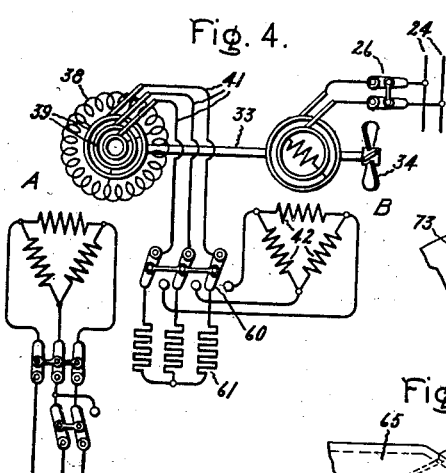
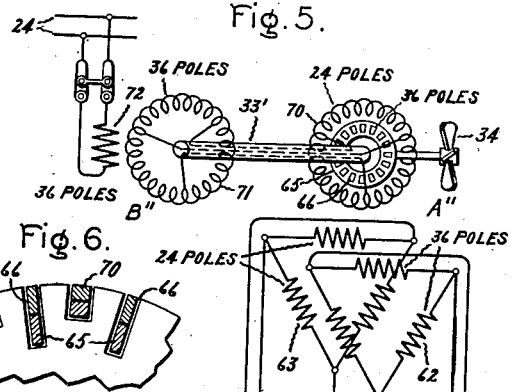
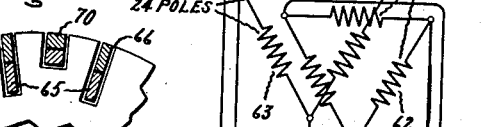
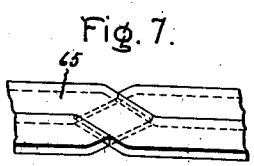
Inventor:
Henry M. Hobart,
by
His Attorney.

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

ELECTRIC SHIP PROPULSION.

1,331,940.   Specification of Letters Patent.   Patented Feb. 24, 1920.

Application filed May 19, 1916. Serial No. 98,548.

*To all whom it may concern:*

Be it known that I, HENRY M. HOBART, a citizen of the United States, residing at Schenectady, in the county of Schenectady, State of New York, have invented certain new and useful Improvements in Electric Ship Propulsion, of which the following is a specification.

My invention relates to electric ship propulsion, and particularly to systems of ship propulsion in which the propellers are driven by alternating current electric motors. The object of the invention is broadly to provide an improved system of electric ship propulsion. More particularly, the object of the invention is to provide an electric propelling system for ships which is not only effective for propelling and maneuvering the ship, but at the same time is economical as regards operating costs and fixed charges.

The improved system of my present invention comprises in one form a high speed elastic fluid turbine direct-connected to a polyphase induction generator. The latter supplies electric energy to a low speed polyphase synchronous motor, which in turn drives the ship's propeller. A polyphase induction motor is preferably associated with the synchronous motor for starting or for obtaining an increased motor torque for certain conditions of navigation. A high speed synchronous condenser driving a continuous current generator is also preferably provided for the excitations of the induction generator and propeller-driving synchronous motor. In accordance with another aspect of my invention, the combination induction-synchronous motor drive for the propeller is so developed as to enable the use of a high speed synchronous generator instead of an induction generator, since a large part of the excitation of the synchronous generator can be furnished by over-exciting the synchronous motor.

It is well known that the higher the speed employed in steam turbines, the lower is their cost and the better is their economy. With our present knowledge of the design of such machines and with the materials available for their construction, a 12,000 KW steam turbine could, with advantage, be designed for a speed of 3600 rpm. or more. But the present limit encountered in the design and construction of satisfactory synchronous generators is only about one-half as great (namely, some 5000 KW) for so high a speed as 3600 rpm. But in contrast with the limitations to the design of a synchronous generator, it may be stated that an induction generator with a squirrel-cage rotor can be designed in any size for as high a speed as would be appropriate for the steam turbine to which it is coupled. Indeed, the higher the speed of an induction generator, the better is its power factor, and, consequently, the lower is the amount of excitation which need be provided for it from the associated synchronous apparatus, such as a synchronous condenser or synchronous motor electrically connected thereto. In ship propulsion there is no necessity for adhering to the standard periodicities employed in land installations, since each ship constitutes a self-contained design. Consequently, a higher speed than 3600 rpm. (which corresponds to 60 cycles with a two-pole machine) may be employed. But 3600 rpm. is a fairly high speed, and since it is a familiar value to electrical engineers, it will be employed in the examples by which this invention will be described.

Turning to the motor for driving the propeller, it is to be noted that unless mechanical gearing is employed the motor must have a very low speed. For large ships, speeds of the low order of some 60 to 200 rpm. are usually desirable in the interests of obtaining good propeller efficiency and good maneuvering properties. One of the difficulties with an induction motor drive for a ship's propeller is that, since for good efficiency the propeller must be designed for a relatively low speed, the induction motor has to have a very large number of poles. This requires that the motor be designed with a very large diameter, and, unless the motor is for very large power, it will be of an undesirably short length, and as a consequence its cost will be great and its efficiency and power factor poor. These bad features are accentuated by the desirability of employing a very high-speed turbo-generator so as to have low fuel consumption. To obtain this high-speed turbo-generator it becomes necessary to adopt a rather high periodicity and 60 cycles is often desirable were it not that the higher the periodicity the worse becomes the design of the induction motor for a given low speed. But if resort is had to a lower periodicity the generator set must be designed for a lower speed than 3600 rpm. and this involves higher fuel consumption for driving the ship. It is not alone the cost of the fuel which makes high fuel consumption so undesirable, but there is the further circumstance in the case of a ship that high fuel consumption means decreased cargo capacity or decreased length of voyage between coaling stations. Every time a ship must put into a port for fuel heavy harbor charges are incurred. Furthermore, the greater the length of the voyage which a ship can make without refueling the greater is the likelihood of being able to put in for fuel at a port where the price of fuel is low. For these reasons I employ in my present system of propulsion synchronous motors for driving the ship's propellers, because synchronous motors, while still faulty in certain of the respects mentioned, are preferable to induction motors at low speeds by reason of the smaller iron losses and consequently better power factor, and especially at the high periodicities corresponding to economical steam turbine generating sets.

For starting and for conditions of navigation requiring a relatively high motor torque I prefer to provide an induction motor in combination with the propeller-driving synchronous motor. In this connection, I have, furthermore, provided an induction-synchronous motor combination which enables the use of a high-speed bi-polar synchronous generator of large capacity in a system of propulsion. One of the particular disadvantages of a system of electric ship propulsion having induction motors for driving the propellers is that the bad power factor of the induction motor makes it necessary that the generator must have a relatively great capacity in KVA, as compared with its output in KW. By the use of induction-synchronous motor units in accordance with my present invention the power factor of the system can be adjusted to unity, in fact the system can even be operated with a leading power factor, by sufficiently over-exciting the synchronous motors. This arrangement permits the field of a synchronous turbo-generator to be relieved from furnishing a very considerable part of the total excitation which would otherwise be required of it, and so facilitate the design of a 3600 rpm., bi-polar, synchronous generator of the desired capacity, that the use of such generators becomes possible, when desired.

The foregoing discussion relates broadly to the simpler forms of the system of my present invention. I have further provided certain advantageous modifications in and additions to the system as hereinbefore broadly defined which will be fully described hereinafter. The novel features which I believe to be patentably characteristic of the invention are definitely pointed out in the claims appended hereto. The arrangement of the various apparatus in the system of my present invention and the mode of operation of the system will be better understood from the following description taken in conjunction with the accompanying drawings, in which;

Figure 1 diagrammatically illustrates one form of my invention which has been hereinbefore particularly referred to; Figs. 2, 3 and 4 diagrammatically represent three combinations of an induction motor associated with the propeller-driving synchronous motor of the system of Fig. 1 for the purpose of obtaining an increased motor torque for reversal and maneuvering in general; Fig. 5 diagrammatically represents what I now consider the preferred combination of propeller-driving induction and synchronous motors for use in the system of Fig. 1; and Figs. 6 and 7 are detail views showing the construction of the rotor of the induction motor unit of the propeller-driving combination of Fig. 5.

Referring first to Fig. 1 of the drawings there is diagrammatically represented a high speed elastic fluid turbine 10 directly coupled to an induction generator. The induction generator comprises a rotor 11, carrying a squirrel cage winding 12 of the usual type, and a three phase stator winding 13. A synchronous condenser or synchronous motor 14 provides the excitation for the induction generator, while a continuous current generator 15 driven by the synchronous motor 14 through speed reduction gearing 16 provides the direct current excitation for the synchronous motor 14 and the propeller-driving synchronous motor 17. The rotor of the synchronous motor 17 is mounted on a shaft 33 carrying a propeller 34. In Fig. 1 of the drawings the propeller-driving synchronous motor 17 is represented as having a three phase alternating current stator winding 18. A double throw switch 19 operates when thrown to its lower position, as viewed in the drawings, to connect the winding 18 to bus bars or leads 21 electrically communicating with the three phase stator winding 13 of the induction generator. A disconnecting switch 22 is included in the bus bars 21 and a reversing switch 45 is provided for reversing the direction of rotation of the propeller-driving synchronous motor 17. The continuous current generator 15 is adapted to be connected by a switch 23 to the direct current mains 24. The field winding 25 on the rotor of the synchronous motor 17 is connected to the direct current mains 24 by means of a switch 26, and similarly the field winding 27 of the synchronous condenser is connected to the direct current mains 24 by a switch 28. Rheostats 29 and 30 are included in the circuits of the field windings 25 and 27, respectively, so that the excitations of the two synchronous machines can be properly adjusted for the purposes of power factor compensation. The direct current mains 24 are preferably permanently excited, as, for example, by an independent exciter set, not shown in the drawings.

For the purpose of further showing the particular advantages of my present system I will cite a specific equipment for which the system has been particularly designed. In this equipment the speed of the two-pole turbo-generator is 3600 rpm. and its rating is 10,000 KW. The propeller-driving synchronous motor 17 has 80 poles and its speed is about 90 rpm. This data correspond to electric energy of a periodicity of about 60 cycles per second. The synchronous condenser of the exciter set will require to have a capacity of some 1500 to 2000 KVA, if it supplies the entire excitation for the induction generator, but ordinarily it will be desirable to supply a considerable portion of the generator's excitation by over-exciting the field of the propeller-driving synchronous motor, in which case the synchronous condenser may be of smaller capacity. The synchronous condenser is preferably a bipolar machine and its speed is hence about 3600 rpm. The synchronous condenser drives the continuous current generator 15 at a speed of about 360 rpm. through the 10 to 1 reduction gearing 16. The rating of the continuous current generator 15 need be only about 100 KW, if its only duty is to excite the synchronous apparatus. But the generator 15 may with advantage also be employed for purposes of lighting, power, and heating, throughout the ship, and it will then be of several times this rating.

The propeller-driving synchronous motor 17 may be provided with a suitable squirrel cage winding 35 near the periphery of its rotor to endow it with good torque at starting. Preferably, however, an auxiliary induction motor 20 is mounted on the same shaft as the synchronous motor. This induction motor may be of the high resistance squirrel cage type or may have a polar secondary winding 31 connected to an external resistance 32. The induction motor 20 is intended to be used only for a short time, as when starting, reversing or maneuvering the ship. It is designed with great heat storage capacity so that its temperature will not rise unduly during the short times it is in service. In the equipment I have just described the induction motor may have only 40 poles. Then, although its synchronous speed on a 60 cycle circuit is 180 rpm., the load upon it when it is in circuit will always be so great that, since its secondary circuit has high resistance, it can never run above some 90 rpm., corresponding to the normal propeller speed and to some 50 per cent. rotor slip of the induction motor. In starting or maneuvering the double-throw switch 19 is thrown to its upper position, as viewed in Fig. 1, whereupon the primary winding of the induction motor is connected in series relation with the alternating current winding 18 of the synchronous motor 17. The synchronous motor will thus start up with the induction motor, and since the slip of the latter will usually be still greater than 50 per cent., previously mentioned, the work will be taken over by the main synchronous motor whenever the speed is above say 70 rpm., and hence the synchronous motor will be designed to have high torque above two-thirds speed. It will be understood that as desired or as the equipment in hand may require either the squirrel cage winding 35 or the auxiliary induction motor 20, or both, may be employed for obtaining the necessary torque at starting.

The induction generator may be initially excited from the synchronous condenser. To this end the direct current generator 15 will be operated as a shunt motor with energy received from the direct current mains 24. The synchronous condenser then operates as a synchronous generator and is driven at substantially its synchronous speed of 3600 rpm. by the direct current machine 15. Alternating current of substantially 60 cycles is thus generated by the synchronous generator and supplied to the stator winding 13 of the induction generator, thereby furnishing the necessary initial exciting current for the latter machine.

In the equipment just described the propeller-driving synchronous motor has 80 poles in order to obtain the low propeller speed with the alternating current energy of high periodicity (60 cycles) furnished by the high speed turbo-generator. While an 80 pole synchronous motor is not as unsatisfactory as an 80-pole induction motor, it is, nevertheless, not an attractive design even in such a large capacity as some 10,000 KW. Two 40-pole motors each of one-half the capacity of the 80-pole motor would be decidedly cheaper, would have better properties, and would go in a space which it would be more convenient to provide, owing to the smaller diameter and greater length. It is practicable to substitute two machines each with 40 poles as the equivalent of the 80-pole synchronous motor by employing the arrangement diagrammatically illustrated in Fig. 2. In this figure two component motor units A and B have their rotors mounted on the same propeller shaft 33. The stator winding 36 of the motor unit A is a 40 pole three phase winding adapted to be connected by means of a switch 37 to the bus bars 21 of the system of Fig. 1. The rotor of the motor unit A carries a 40-pole three phase winding 38 brought out to slip rings 39 and connected by means of brushes 40 and suitable leads 41 to a 40-pole three phase stator winding 42 of the motor unit B. The rotor winding 43 of the motor unit B is a 40-pole winding adapted to be supplied with direct current from the mains 24. It will thus be observed that the motor unit A is in effect of the induction type, while the motor unit B is in effect of the synchronous type. When the motor windings are connected as represented in Fig. 2 the combined motor units A and B will have a speed corresponding to an equivalent 80-pole motor, and hence the propeller shaft 33 will be driven at 90 rpm. By sufficient excitation of the continuous current field winding 43 of the synchronous motor unit B, the current may be made to lead sufficiently to provide the excitation for the induction generator of the system.

In Fig. 3 of the drawings there is diagrammatically illustrated a modified connection of the windings of the motor units A and B which has the advantage of avoiding the need for any collector rings, or moving contacts of any kind. The stator winding 36 of the motor unit A' of Fig. 3 is the same as the corresponding stator winding 36 in Fig. 2. The rotor winding 38' of the motor unit A' of Fig. 3 is electrically connected to a corresponding three phase winding 42' on the rotor of the motor unit B', as for example, through an axial hole in the shaft 33'. The rotor winding 42' thus corresponds to the stator winding 42 of the motor combination of Fig. 2. The stator winding 43' of the motor unit B' is a Y-connected three phase winding whose terminals may be connected by a switch 50 to an external resistance 51 or to the D. C. mains 24. For conditions of navigation requiring relatively high motor torque, the switch 50 is thrown to connect the stator winding 43' to the external resistance 51, as indicated in the figure. The motor units A' and B' are then electrically connected as two concatenated induction motors, and due to the presence of the external resistance 51 this concatenated induction motor combination possesses high starting torque. For normal conditions of navigation the switch 50 is thrown to connect the stator winding 43' to the D. C. mains 24. Assuming that the moto unit A' has 40 poles and the motor unit B' 40 poles, then the speed of the propeller-driving motor combination will correspond to a single machine having 80 poles. Moreover, this concatenated induction-synchronous motor combination can be operated with unity power factor, or even with a leading current if the direct current field strength is raised by a sufficient amount. Consequently, the concatenated motor combination of Fig. 3 furnishes a much more desirable load on any system than would a propeller-driving induction motor, and, furthermore, it is free from the disadvantage of a straight synchronous motor drive in that it does not have any sliding contacts whatever.

In Fig. 4 of the drawings there is diagrammatically represented a slightly modified combination of induction-synchronous motor drive. The motor units and their windings of Fig. 4 are identical with the motor units and windings of Fig. 2 and corresponding elements of the two figures have been designated by the same reference numerals. In the combination of Fig. 4 a double-throw switch 60 is provided for connecting the rotor winding 38 of the motor unit A to an external resistance 61 or to the stator winding 42 of the motor unit B. Thus for navigating conditions requiring high motor torque the switch 60 will be thrown to the position indicated in Fig. 4 and the propeller shaft 33 will be driven by the motor unit A which acts as an ordinary induction motor with a polar secondary winding connected to an external resistance. For normal navigation the switch 60 will be thrown to its right-hand position, as viewed in Fig. 4, thus giving the connections represented in Fig. 2 of the drawings.

In Fig. 5 of the drawings, the propeller-driving motor combination comprises an induction motor unit A'' and a synchronous motor unit B'', more or less analogous to the corresponding motor units of Figs. 2, 3 and 4. The stator of the motor unit A'' carries a primary winding which is adapted to be connected to produce primary magnetic fields of two different pole numbers. As is well known in the art a single primary winding may be provided for this purpose, such for example, as described in Alexanderson Patent No. 841,609, dated January 15, 1907. For the purposes of explanation, however, I have diagrammatically represented two independent primary windings 62 and 63 adapted to be connected by a switch 64 to the bus bars 21, and such independent windings are often preferable. By way of example, I will assume that the winding 62 is a 36-pole winding, while the winding 63 is a 24-pole winding. The rotor of the motor unit A'' carries a 36-pole short-circuited polar winding 65. The winding 65 is a double-layer winding carried in deep slots 66 in the magnetic core of the rotor. The two conductor bars per slot of the short-circuited winding 65 are offset near their centers so that each conductor bar is the bottom bar through one-half of the slot and the top bar through the other half of the slot as indicated in Fig. 7 of the drawings. This deep bar double-layer short-circuited winding is described in the U. S. patent to Kierstead, No. 1,188,182 dated June 20, 1916, and provides a short-circuited secondary winding of relatively high resistance when the secondary currents are of relatively high frequency, that is, when the slip of the motor is large. In addition the rotor of the motor unit A″ carries a 24-pole three phase winding 70 which is connected by conductors extending through the hollow shaft 33′ of the motor combination to a 36-pole three phase rotor winding 71 of the motor unit B″. The stator winding of the motor unit B″ is a 36-pole winding 72 adapted to be supplied with direct current from the mains 24. The polyphase rotor winding 70 of the motor unit A″ is arranged in shallow slots 73 alternating with the deep slots 66 in the magnetic core of the rotor member of this motor unit.

The operation of the motor combination of Fig. 5 will, it is believed, be understood from the foregoing description. For conditions requiring a high motor torque, such as for reversal after full speed ahead or for maneuvering in general, the 36-pole primary winding 62 will be connected to the bus bars 21. The 24-pole rotor winding 70 will be utterly inert under such conditions, and the secondary current of the motor will flow entirely in the short circuited winding 65, and due to the design of this winding the motor unit A″ will possess a high starting torque. Consequently, with this connection nothing happens in the component motor B″, the torque for driving the propeller shaft being provided entirely in the motor component A″. When the need for high torque has ceased the 24-pole primary winding of the motor unit A″ is connected to the bus bars 21. Under this condition of operation the short-circuited rotor winding 65 becomes inert since it is uninfluenced by the 24-pole winding 63. The shallow-slot polyphase winding 70, however, responds to the influence of the 24-pole stator winding 63. Due to the connection of the polyphase rotor windings 70 and 71 the compound motor runs with a speed corresponding to the sum of the 36 poles on motor unit B″ and the 24 poles on A″, that is it runs at a speed corresponding to a 60-pole motor. A 60-pole motor when supplied with alternating current energy of 60 cycles runs at 120 rpm., consequently the contatenated induction-synchronous motor combination A″—B″ drives the propeller at a speed of approximately 120 rpm. By increasing the continuous current excitation on the 36-pole field winding 72 on the stator of the motor unit B″, the alternating current of the system can ultimately be made to lead which will relieve the field of the turbo-generator from requiring so much excitation or heating as would be required by a simple 60-pole squirrel cage induction motor.

The concatenated induction-synchronous motor combination of my present invention can obviously be operated from any source of alternating current energy. As previously mentioned, I preferably employ an induction generator in my present system because a high speed bi-polar synchronous generator of the desired capacity cannot be satisfactorily built, due to the field heating. By the use of my proposed concatenated induction-synchronous motor combination a very considerable part of the necessary excitation for a synchronous generator can be supplied by the concatenated motor combination by over-exciting the synchronous motor unit thereof. If a synchronous turbo-generator is thus employed, its field will require only about one-half as much copper when used to supply a compound concatenated motor of the type herein described, as when used to supply a single equivalent squirrel cage induction motor. This will improve the design of the turbo-generator much more than would be realized at first sight, since the limit of design for a synchronous turbo-generator of 3600 rpm. is in the field heating. With a decrease of 50 per cent. in the amount of field copper and in watts required for excitation, successful designs for 6000 or 8000 KW, 3600 rpm., 60 cycle synchronous generators can be made as readily as is ordinarily the case with 3000 or 4000 KVA generators for 3600 rpm., 60 cycles. Accordingly, high speed bi-polar synchronous turbo-generators of greater capacities than have heretofore been practical may be designed for use in combination with my improved concatenated induction-synchronous motor.

The motor unit A″, and generally the corresponding motor units of Figs. 2, 3 and 4, must take in the entire power required and hands on a matter of one-half of this power to the other motor unit B″. The precise amount of power delivered as electricity to the second motor unit is a function of the individual numbers of poles. Thus, if the second unit has only one-quarter as many poles as the first unit, then three-quarters of the electricity received by the first unit is transformed therein into mechanical energy and only one-quarter is handed on as electricity to the second motor unit. The motor unit A″ consequently has to be of considerably larger size than if it only dealt with one-half the power. However, since it is of scarcely more than one-half the diameter of a 60-pole induction motor, and since roughly speaking the cost decreases as the cube of the diameter and only increases, roughly, as the square root of the length, the concatenated induction-synchronous motor combination of my present invention is decidedly cheaper and is obviously much more compact than a single 60-pole squirrel cage induction motor, and, like the latter, my improved concatenated motor combination has no moving contacts whatsoever. Furthermore, my improved motor combination has the great advantage of operating at unity power factor, or if desired with a leading power factor.

What I claim as new and desire to secure by Letters Patent of the United States, is:—

1. An electric system of ship propulsion comprising a propeller, a relatively low speed alternating current synchronous motor arranged to drive said propeller, a relatively high speed alternating current generator for delivering alternating current energy to said synchronous motor, means for furnishing excitation to both said generator and said motor, an elastic fluid turbine coupled to said generator and a motor element adapted to produce a high torque for driving the propeller during conditions of navigation requiring high motor torques.

2. An electric system of ship propulsion comprising a propeller, an alternating current synchronous motor arranged to drive said propeller, a bi-polar induction generator for delivering alternating current energy to said synchronous motor, means for furnishing excitation to both said generator and said motor, a high speed elastic fluid turbine directly coupled to said generator, the synchronous speed of said synchronous motor being less than one-tenth the speed of the elastic fluid turbine and an induction motor element supplied with energy from the induction generator for operating the propeller with high torque for maneuvering purposes.

3. An electric system of ship propulsion comprising a propeller, a relatively low speed alternating current synchronous motor arranged to drive said propeller, a bi-polar induction generator for delivering alternating current energy to said synchronous motor, a high speed elastic fluid turbine coupled to said generator, a high speed synchronous condenser electrically connected to said generator and adapted to furnish all or a part of the excitation for the generator, a relatively low speed direct current generator having a speed reduction gearing for coupling it to said synchronous condenser and adapted to supply the excitation for said synchronous motor and an induction motor element supplied with energy from the induction generator for operating the propeller with high torque for maneuvering purposes.

4. An electric system of ship propulsion comprising a propeller, an alternating current synchronous motor arranged to drive said propeller, an induction generator for delivering alternating current energy to said synchronous motor, an elastic fluid turbine coupled to said generator, a synchronous condenser electrically connected to said generator and adapted to furnish the excitation for the generator, an auxiliary direct current generator mechanically coupled to said synchronous condenser and adapted to furnish the excitation for said synchronous motor and condenser and an induction motor element supplied with energy from the induction generator for operating the propeller with high torque for maneuvering purposes.

5. A system for electrically propelling ships comprising a high speed steam turbine, a squirrel cage polyphase induction generator direct-connected to said turbine, a propeller, a low speed polyphase synchronous motor direct-connected to said propeller and adapted to be supplied with polyphase electric energy from said generator, a high speed polyphase synchronous condenser for supplying all or a part of the excitation of said induction generator, a continuous current generator, a speed reduction gearing for coupling said continuous current generator to the synchronous condenser to be driven thereby, electrical connections whereby said continuous current generator supplies the excitation for said synchronous motor and condenser and an induction motor element supplied with energy from said generator for operating the propeller with high torque for maneuvering purposes.

6. An electric system of ship propulsion comprising a high speed elastic fluid turbine, a bi-polar induction generator of the squirrel cage type directly coupled to said turbine, a propeller shaft, an induction motor unit and a synchronous motor unit having their rotors mounted on said propeller shaft, means for electrically connecting the induction motor unit to said generator for starting and operating the propeller with high torque for maneuvering purposes and means for electrically connecting said motor units in concatenation and to said induction generator whereby the speed of the concatenated induction-synchronous motor combination corresponds to the speed of a single motor having a number of poles equal to the sum of the poles of said two motor units.

7. An electric system of ship propulsion comprising an elastic fluid turbine, an induction generator coupled to said turbine, a propeller shaft, an induction motor unit electrically concatenated with a synchronous motor unit and electrically connected to said induction generator, the rotors of said two motor units being mounted on said propeller shaft and means for electrically connecting the induction motor unit to said generator for starting and operating the propeller with high torque for maneuvering purposes.

8. An electric system of ship propulsion comprising a propeller shaft, an induction motor unit having its rotor mounted on said shaft, a synchronous motor unit having its rotor also mounted on said shaft, an elastic fluid turbine, an alternating current generator direct connected to said turbine, and means for electrically connecting said induction motor unit to said generator for induction motor operation for conditions of navigation requiring a large motor torque and for electrically concatenating said two motor units for ordinary navigation of the ship.

9. An electric system of ship propulsion comprising an elastic fluid turbine, an alternating current generator coupled to said turbine, a propeller shaft, an induction motor unit having a primary stator winding electrically connected to said generator and a secondary rotor winding, and a synchronous motor unit having a direct current stator winding and an alternating current rotor winding electrically connected to the secondary rotor winding of said induction motor unit for ordinary navigation of the ship, the rotors of said two motor units being mounted on said propeller shaft, and means for operating the induction motor unit alone for conditions of navigation requiring a large motor torque.

10. An electric system of ship propulsion comprising a propeller shaft, an induction motor unit having a primary stator winding and a secondary rotor winding, a synchronous motor unit having a direct current stator winding and an alternating current rotor winding adapted to be electrically connected to the secondary rotor winding of said induction motor unit, an elastic fluid turbine, an alternating current generator direct connected to said generator, means for electrically connecting the primary winding of said induction motor unit to said generator for induction motor operation for conditions of navigation requiring a large motor torque and for electrically concatenating said two motor units for ordinary navigation of the ship, and means whereby the motor torque is accentuated during the induction motor operation.

11. An electric system of ship propulsion comprising a propeller shaft, an induction motor unit having a primary stator winding adapted to be connected to produce primary magnetic poles of two different pole numbers and two secondary rotor windings, one of said secondary windings being a locally short-circuited winding responsive to the higher pole number of said primary winding and the other of said secondary windings being a polar winding responsive to the lower pole number of said primary winding, said short-circuited secondary winding having relatively high resistance when the secondary current is of relatively high frequency, a synchronous motor unit having a direct current stator winding and an alternating current rotor winding electrically connected to the polar secondary winding of said induction motor unit, a source of alternating current energy, and means for electrically connecting the primary winding of said induction motor unit to said source so as to produce its higher pole number for conditions of navigation requiring a large motor torque and for connecting the primary winding to said source so as to produce its lower pole number for ordinary navigation of the ship.

12. An electric system of ship propulsion comprising, an elastic fluid turbine, an induction generator coupled thereto, a propeller shaft, an induction motor unit having its rotor mounted on said shaft, means for electrically connecting the induction motor unit to said generator for conditions of navigation requiring large motor torque, a synchronous motor unit having its rotor mounted on said shaft, means for electrically concatenating the induction and synchronous motor units for ordinary navigation of the ship, a synchronous condenser electrically connected to furnish excitation to said induction generator, and a direct current generator mechanically coupled to said synchronous condenser and electrically connected to furnish excitation to said synchronous motor unit.

In witness whereof I have hereunto set my hand this 18th day of May, 1916.

HENRY M. HOBART.